United States Patent [19]

Irwin

[11] 4,045,048
[45] Aug. 30, 1977

[54] TRAILING ARM CAMBERING VEHICLE WITH STABILIZER LINKAGE HAVING LOCKING MEANS FOR PARKING AND STOWAGE

[75] Inventor: Clarence C. Irwin, Sterling Heights, Mich.

[73] Assignee: General Motors Corporation, Detroit, Mich.

[21] Appl. No.: 727,587

[22] Filed: Sept. 28, 1976

[51] Int. Cl.² .................... B62K 15/00; B60G 19/10
[52] U.S. Cl. .......................... 280/278; 280/112 A; 280/221; 280/293
[58] Field of Search .............. 280/221, 200, 210, 218, 280/220, 224, 233, 282, 283, 87 R, 87.04 R, 87.04 A, 87.1, 6.11, 21 R, 21 A, 14, 15, 16, 17, 12.1, 12 H, 111, 112 R, 112 A, 113, 293, 278, 287; 180/25 R, 25 A, 26 R

[56] References Cited

U.S. PATENT DOCUMENTS

| 1,703,174 | 2/1929 | Roe | 280/287 X |
| 2,593,974 | 4/1952 | Brown | 280/21 R |
| 3,033,585 | 5/1962 | Marston et al. | 280/121 X |
| 3,623,749 | 11/1971 | Jensen | 280/287 X |
| 3,964,563 | 6/1976 | Allen | 180/41 X |

FOREIGN PATENT DOCUMENTS

| 454,337 | 1/1950 | Italy | 280/293 |
| 4,942,586 | 11/1974 | Japan | 280/87 R |

Primary Examiner—Philip Goodman
Assistant Examiner—Jack D. Rubenstein
Attorney, Agent, or Firm—Charles R. White

[57] ABSTRACT

An articulated cambering vehicle in which a pair of trailing arms are interconnected to each other and to a steering frame by stabilizer linkage which includes a support and locking plate pivoted to the frame and a pair of side links each being pivotally connected to the support and locking plate and to the trailing arms. A locking device is employed to lock the plate at an infinite number of positions to lock up the vehicle in a stand-up position for parking purposes. One of the side links can be telescoped and shortened to allow the vehicle to be collapsed into a folded low-profile position. By locking the side link in the telescoped position the vehicle is rigidly maintained in the folded position.

3 Claims, 3 Drawing Figures

TRAILING ARM CAMBERING VEHICLE WITH STABILIZER LINKAGE HAVING LOCKING MEANS FOR PARKING AND STOWAGE

This invention relates to a cambering vehicle having a pair of trailing arms pivoted to a front steering frame for up and down swinging movement interconnected to each other and to the frame by a new and improved stabilizing linkage which permits the equalized camber of all ground contacts during vehicle operation and which further provides for upright vehicle parking on level and inclined surfaces and for vehicle stowage in a collapsed position.

Copending patent application, Ser. No. 713411, entitled "Cambering Vehicle" filed Aug. 11, 1976, and assigned to the assignee of this invention, concerns a cambering vehicle having a pair of trailing arms pivoted to a front steering frame interconnected by a mechanical stabilizer system which permits the arms to be locked relative to each other and folded toward the steering frame so that the frame and steering arm are positioned adjacent to each other and extend in generally the same direction. In this manner the vehicle is collapsible into a low-profile configuration and provides a rigid package that can be grasped in one hand and placed in a relatively small compartment such as the truck of an automobile. Two forms of mechanical stabilizer systems are disclosed by the above-noted patent application, with one employing cables and the other having link members for interconnecting the trailing arms and equalizing the relative movement thereof as the vehicle negotiates a turn.

This invention is drawn to a cambering vehicle of the above-described type which incorporates a linkage system and more particularly the invention concerns a new and improved mechanical stabilizer linkage system which incorporates a pair of side links pivotally connected at their lower ends to each respective trailing arms and at their upper ends to a support and locking plate which in turn is pivoted to the steering frame of the vehicle. This linkage system thus interconnects the trailing arms and the steering frame for cambering operations but further includes a locking arrangement that allows the members of the linkage to be locked from relative movement so that the vehicle can be parked in an upright position on a level or inclined surface. In addition, the members of the linkage being articulated can be positioned relative to each other and locked in position so that the trailing arms are located adjacent the steering frame to provide a compact package for storage purposes. More specifically, the mechanical stabilizer linkage incorporated with this vehicle has a new and improved upper support and locking plate means mounted on the steering frame for rotational movement about a pivot shaft extending rearwardly from the steering frame and interconnected to a pair of trailing arms by left and right side links. The upper support and locking plate is formed with a curved guide slot or equivalent track located on a circle having its center coaxially aligned with the center of the pivot shaft. In the preferred embodiment, a reinforcement member in the form of an elongated bar is mounted on the pivot shaft in overlapping relationship with the support and locking plate. In normal vehicle operation the stabilizing linkage supports the steering frame in a predetermined rake angle with respect to ground and further provides for the equal and opposite movement of the trailing arms as the vehicle is rolled to one side or the other as when negotiating a camber-steered turn. A manual lock device is carried by the steering frame and has a portion extending through the slot allowing pivotal movement of the support plate for normal cambering operation of the vehicle. This locking device can be actuated to physically secure the support plate to the frame whereby the linkage is locked up so that the vehicle can be parked in an upright position on ground level or on hillside as ground conditions dictate. The linkage system also incorporates an improved side link which can be selectively telescoped and collapsed when the vehicle steering frame is folded toward the trailing arms to provide for a compact, low-profile vehicle package. The vehicle may be subsequently locked in the folded position to facilitate handling by locking the telescoping link in its collapsed position.

Another feature, object and advantage of the present invention is to provide a new and improved cambering vehicle having a pair of trailing arms which are interconnected to each other and to a main steering frame by a stabilizer linkage that includes a support and locking plate mechanism pivoted to the main frame and a pair of side links each being pivotally connected to the support and locking plate and to the trailing arms to provide three sides of a parallel linkage. A locking device is employed to secure this plate at an infinite number of positions to lock up the stabilizer linkage and thereby lock the articulated components of the vehicle for vehicle parking purposes. One of the side links can be telescoped so that the main steering frame can be moved toward the trailing arms into a compact collapsed position and the side link can be subsequently locked in the telescoped position to thereby secure the vehicle in a folded position so that it can be readily handled and stowed.

Another feature, object and advantage of this invention is to provide a new and improved stabilizer linkage mechanism for a cambering vehicle having three ground contacts and having an articulated framework comprising a pair of trailing arms and a front steering column interconnected by the stabilizer linkage having one side link selectively movable to a telescoped position to thereby permit the vehicle frame to be collapsed to a minimum size package for transportation and stowage purposes.

Another feature, object and advantage of this invention is to provide a new and improved stabilizer linkage for an articulated frame cambering vehicle having a front steering frame and a pair of rearwardly extending trailing arms supporting a vehicle operator with the stabilizer linkage interconnecting the trailing arms and the front steering frame in a manner such that the trailing arms move in equal and opposite directions and which permit the locking of the trailing arms in any angular position for vehicle parking purposes on a flat surface or on an incline and which further permits the arms to be folded relative to the main steering frame so that the vehicle can be collapsed to a minimal profile package for transportation and storage purposes.

These and other objects, features and advantages of this invention will be more apparent from the following detailed description and drawing in which.

Figure 1:
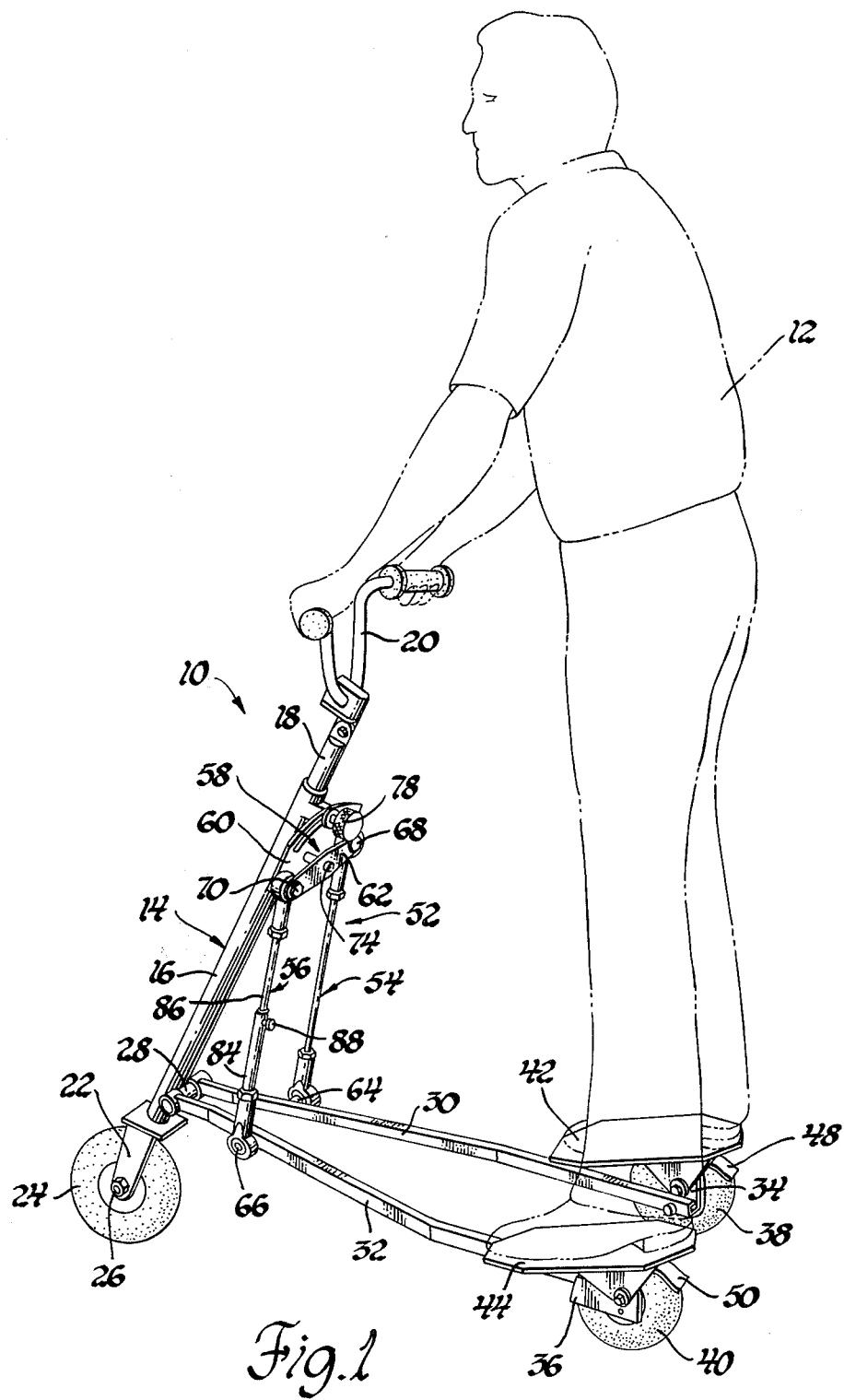
FIG. 1 is a perspective view showing the cambering vehicle incorporating the stabilizer linkage made in accordance with this invention.
Figure 2:
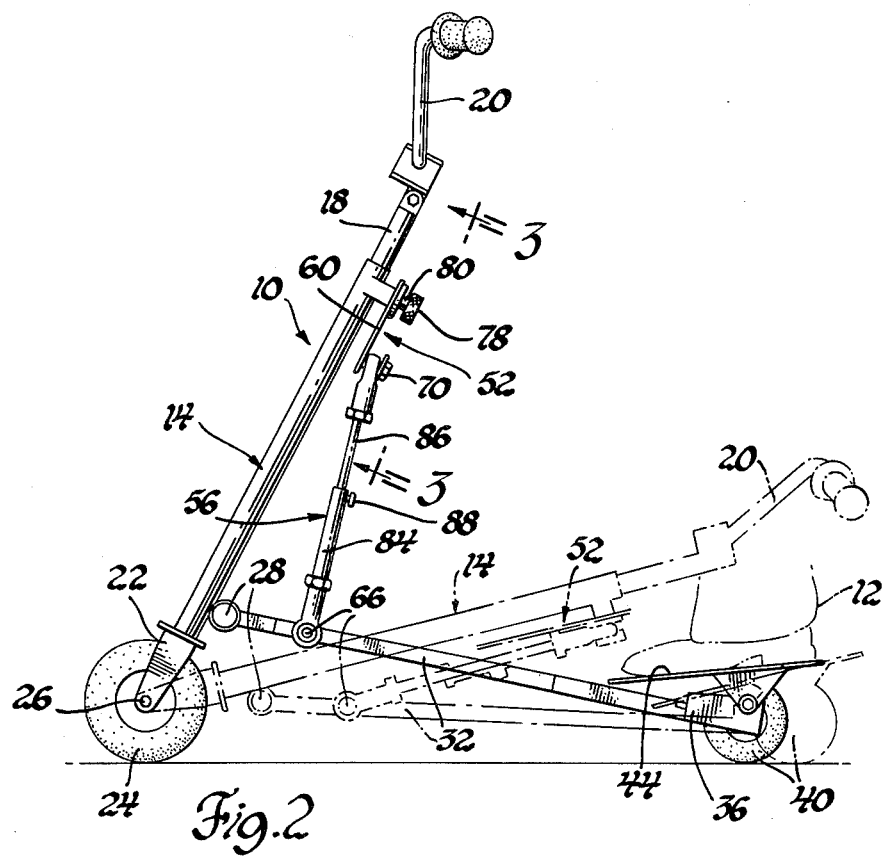
FIG. 2 is a side elevational view of the vehicle of FIG. 1.

Referring to FIGS. 1 and 2 of the drawing, a cambering vehicle 10 is shown which is adapted to be manually propelled forwardly by the input of a vehicle operator 12 through the timed shifting of his weight from one foot to the other coordinated with the left and right steering of the vehicle in a sinuous path. A vehicle of this type is disclosed in copending patent application Ser. No. 649,967, filed Jan. 19, 1976 entitled "Cambering Vehicle" and the disclosure of this copending application is hereby incorporated by reference into this application for details of this method of operation. It will be appreciated that although a manually propelled vehicle is shown in the drawing, an internal combustion engine or an electric motor can be combined with the vehicle for driving the front wheel to thereby provide a powered version of the vehicle.

The cambering vehicle 10 comprises a steering frame 14 that includes a tubular column 16 which serves to axially align and rotatably support an elongated steering shaft 18 which extends therethrough. The upper end of the steering shaft is provided with a handle bar assembly 20 while the lower end is formed with a fork 22 which rotatably supports the front wheel 24 of the vehicle. The front wheel 24 rotates on an axle 26 which extends transversely through and which is supported by the fork 22. The lower end of the tubular column 16 is rigidly formed with a transverse shaft 28, the outer ends of which pivotally support the front end of a pair of laterally spaced and rearwardly extending trailing arms 30 and 32 that respectively support brackets 34 and 36 on the free ends thereof.

Rear wheels 38 and 40 are respectively supported for rotation on axles carried by brackets 34 and 36. These brackets also pivotally support foot pads 42 and 44, on which the operator 12 may stand and steer the vehicle. The foot pads may be rocked by foot work of the operator between a forward vehicle-operating position illustrated in FIG. 1 and a rearward, vehicle-braking position in which brake pads 48 and 50 frictionally engage the rear wheels.

A stabilizer linkage system 52 is provided to interconnect the trailing arms 30 and 32 to each other and to column 16 to prevent collapse of the vehicle during operation and when parked and further to control and equalize movement of the trailing arms when the vehicle is leaned into a turn. The linkage system 52 includes a pair of side links 54 and 56 interconnected by an upper support and locking plate assembly 58 which comprises a base plate 60 and a reinforcement bar 62. The lower ends of the links 54 and 56 are respectively connected to the front portion of the trailing arms 30 and 32 by tranversely extending pivot members 64 and 66 respectively while the upper ends of the links 54 and 56 are connected to the upper crank assembly 58 by longitudinally extending pivot members 68 and 70 respectively. Each of the pivot members 64, 66, 68 and 70 preferably includes spherical bearing means (not shown) which allows limited universal pivotal motion to facilitate the folding movement of the column 16 and the trailing arms together into a compact package so that the vehicle can be easily carried or stowed as will be further described below. As will seen best in FIGS. 2 and 3 the base plate 60 and reinforcement bar 62 are mounted for pivotal movement on pivot pin 74 which is secured to and which projects rearwardly from the upper portion of the tubular column 16. The base plate 60 is preferably flat and has an arcuate guide slot 76 located on a circle having its center coaxial with the center of the pivot 74. The reinforcement bar 62 is preferably an elongated flat member which overlies and strengthens the base plate 60 and cooperates therewith to pivotally support the upper end of links 54 and 56. A parking knob 78 having shank 80 extending through slot 76 is adjustably threaded into column 16. The manual parking knob 78 can be turned by the operator to advance the shank 80 into the column 16 to ground plate 60 to the column. This action prevents the upper crank assembly from turning to thereby lock the trailing arms to the frame. Under such conditions the vehicle frame is made rigid to provide for parking on a flat surface or an inclined surface as dictated by position of the swing arms on the support surface.

Figure 3:
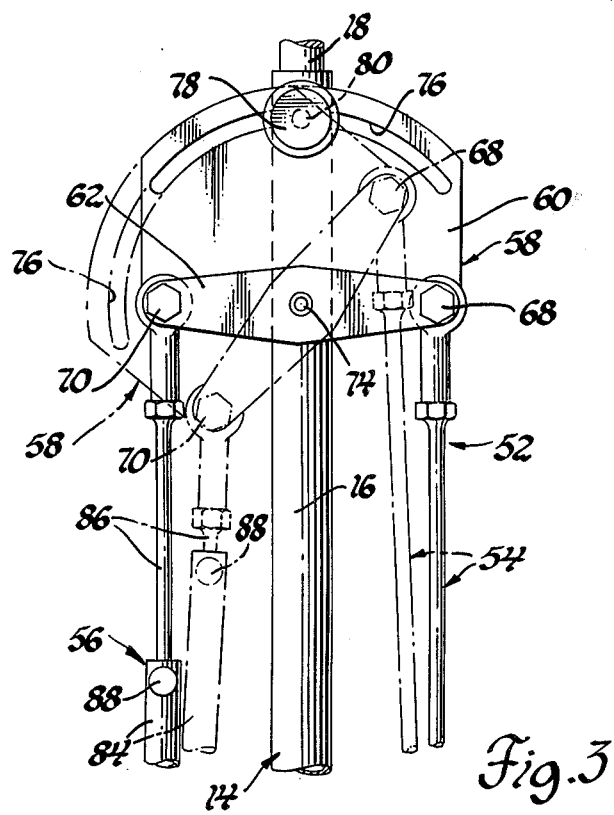
FIG. 3 is a view taken along line 3—3 of FIG. 2 showing a portion of the stabilizer linkage of this invention.

In addition to providing for parking on a flat surface and on an incline, this invention further provides for the improved folding and locking of the vehicle in a compact, low-profile package for improved portability and stowage. The side link 56 comprises an outer cylindrical tube 84 pivoted at its lower end to the left trailing arm 32 by pivot 66 which telescopically receives rod 86 pivoted at its upper end to the support and locking assembly. A thumb screw or other suitable fastener 88 extends through the wall of tube 84 into engagement with rod 86 to normally maintain the side link 56 in the extended position shown in the FIGS. whereby it equals the length of side link 54 to provide the stabilizer linkage needed for vehicle operation including cambered steering and for vehicle parking purposes. In the event that it is desired to collapse the vehicle and assuming that the parking knob 78 is loose the thumb screw 88 is loosened so that the steering frame can be folded toward a bisecting position with respect to the trailing arms best shown in phantom lines in FIG. 2. As the steering frame is being folded the upper crank assembly pivots counter-clockwise as shown in FIG. 3 with rod 86 telescoping into the tube 84. In the fully collapsed position the vehicle is in phantom line position shown in FIG. 2. The vehicle is maintained in this position by tightening the thumb screw 88 so that the stabilizer linkage can be moved to the full line position shown in the FIGS. If desired, although not required, the parking knob 78 can be tightened to assist in locking the vehicle in the folded position whereby it can be conveniently carried or stowed. To unfold the vehicle the thumb screw 88 is loosened and subsequently tightened after the steering frame is moved to the upright position illustrated in the drawings.

While a preferred embodiment of the invention has been shown and described to illustrate the invention, other embodiments will now be readily apparent to those skilled in the art. Accordingly, the limits of this invention are set forth by the following claims.

What is claimed is:

1. A cambering vehicle comprising a main frame, right and left trailing arms extending rearwardly from said main frame, forward pivot connection means pivotally connecting one end of each of said arms to said main frame so that said trailing arms may swing in an up and down movement with respect to said forward pivot connection means, a support and locking plate, pivot means pivotally mounting said support and locking plate to said forward portion of said frame in spaced relation to said forward pivot connection means for said trailing arms, left and right link means connected to said crank by laterally spaced pivot means, each of said link means extending from said plate to a pivot connection with the associated trailing arm rearward of said forward pivot connection means, front contact means steerably mounted to said main frame, manual steering means connected to said front contact means, and rear contact means for each of said trailing arms mounted at the rearward portions thereof foot rest means on each of said trailing arms rearward of said pivot connections with said link means to receive the feet of a vehicle operator so that an operator can stand on the vehicle and naturally camber the vehicle while the vehicle is moving, curved track means operatively connected to said plate and movable therewith, a follower for said track means operatively connected to said main frame and operative to secure said plate in a fixed position to stabilize said vehicle rigid in a three point stance for vehicle parking and means to foreshorten one of said links as said trailing arms are moved toward said main frame as said plate turns and said follower means moves relative to said track means to a position in which said vehicle is in a folded position, and means to rigidly secure said last mentioned link in said foreshortened position to maintain said vehicle in a collapsed position for stowage.

2. A cambering vehicle comprising a steering frame, laterally spaced right and left trailing arms extending rearwardly from said steering frame, forward pivot connection means pivotally connecting one end of each of said arms to said frame so that said trailing arms may swing in an up and down movement with respect to said forward pivot connection means, a support plate, pivot means pivotally mounting said support plate to said forward portion of said frame in spaced relation to said forward pivot connection means for said trailing arms, left and right side link means, spaced pivot means connecting said left and right link means to said support plate each of said link means extending from said support plate to a pivot connection with the associated trailing arm rearward of said forward pivot connection means, front ground contact means steerably mounted to said steering frame, manual steering means connected to said front contact means, and a rear ground contact means for each of said trailing arms mounted at the rearward portions thereof, foot rest means on each of said trailing arms rearward of said pivot connections with said link means to receive the feet of a vehicle operator so that an operator can stand on the vehicle and shift his weight by naturally leaning to camber the vehicle while the vehicle is moving, curved track means operatively connected to said support plate and movable therewith, a follower for said track means operatively connected to said main frame and selectively operative to secure said support plate in a fixed position to lock said vehicle in a rigid three point stance for vehicle parking and means to foreshorten one of said side link means as said trailing arms are moved toward said main frame as said support plate turns on said pivot means and said follower means moves relative to said track means to a position in which said vehicle is in a folded position, and fastener means to secure said last mentioned link means in said foreshortened position to rigidly maintain said vehicle in a collapsed position for stowage.

3. A cambering vehicle having an upright operating and parking position and a folded low-profile stowage position comprising a steering frame, laterally spaced right and left trailing arms extending rearwardly from said steering frame, forward pivot connection means pivotally connecting one end of each of said arms to said frame so that said trailing arms may swing in an up and down movement with respect to said forward pivot connection means, a support plate, pivot means pivotally mounting said support plate to said forward portion of said frame in spaced relation to said forward pivot connection means for said trailing arms, left and right side link means, spaced pivot means connecting said left and right link means to said support plate each of said link means extending from said support plate to a pivot connection with the associated trailing arm rearward of said forward pivot connection means, front ground contact means steerably mounted to said steering frame, manual steering means connected to said front contact means, and a rear ground contact means for each of said trailing arms mounted at the rearward portions thereof, foot rest means on each of said trailing arms rearward of said pivot connections with said link means to receive the feet of a vehicle operator so that an operator can stand on the vehicle and shift his weight by naturally leaning to camber the vehicle which the vehicle is moving, circular track means operatively connected to said support plate and movable therewith, a follower operatively connected to said steering frame for movement along said circular track means and lock means selectively operative to secure said follower in any position along said circular track means to thereby secure said support plate in a corresponding fixed position to lock said vehicle in a selected rigid three point stance for vehicle parking, one of said side link means having outer and inner members that are adapted to telescope and foreshorten when said vehicle is folded and said trailing arms are moved toward said main frame as said support plate turns on said pivot means and said follower means moves relative to said track means, and fastener means to secure said outer and inner members in adjusted position with respect to each other in an extended position for vehicle operation and in a foreshortened position for folded low-profile stowage.

* * * * *